(12) United States Patent
Doyle et al.

(10) Patent No.: US 8,625,029 B2
(45) Date of Patent: Jan. 7, 2014

(54) HDMI SOURCE DETECTION

(75) Inventors: Paul Doyle, San Marcos, CA (US); Eiji Kono, San Diego, CA (US); Tetsuya Nomura, Kanagawa (JP); Peter Rae Shintani, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1357 days.

(21) Appl. No.: 12/002,378

(22) Filed: Dec. 17, 2007

(65) Prior Publication Data

US 2009/0156051 A1 Jun. 18, 2009

(51) Int. Cl.
```
H04N 7/00      (2011.01)
H04N 11/00     (2006.01)
H04N 5/44      (2011.01)
H04N 3/27      (2006.01)
H04N 5/46      (2006.01)
```

(52) U.S. Cl.
USPC ........... 348/553; 348/461; 348/464; 348/554; 348/555; 348/556; 348/557; 348/558

(58) Field of Classification Search
USPC .................. 348/706, 843, 461, 464, 554–558
See application file for complete search history.

(56) References Cited

U.S. PATENT DOCUMENTS

```
5,636,347  A       6/1997   Muchnick et al.
6,973,582  B2 *   12/2005   Sugiura et al. ............... 713/320
7,268,561  B2      9/2007   Zhu
2006/0280055 A1 * 12/2006   Miller et al. ................ 369/44.11
2007/0220150 A1 *  9/2007   Garg .............................. 709/226
```

OTHER PUBLICATIONS

U.S. Appl. No. 60/852,313, filed Oct. 16, 2006, Shintani et al.
U.S. Appl. No. 11/703,304, filed Feb. 6, 2007, Shintani et al.

* cited by examiner

*Primary Examiner* — Pankaj Kumar
*Assistant Examiner* — Alazar Tilahun
(74) *Attorney, Agent, or Firm* — Miller Patent Services; Jerry A. Miller

(57) ABSTRACT

A circuit for detection of an HDMI source device to an HDMI sink device through an HDMI sink connector without regard for the activity state of the HDMI source device has a pull-up resistor having first and second terminals with the first terminal coupled to a DC power source. A switching device is coupled between the pull-up resistor's second terminal and ground at a circuit node. The switching device is switched on to couple the circuit node to ground when power is applied to a control terminal thereof from the HDMI sink connector power pin, and being switched off otherwise. The circuit node is coupled to a DDC/CEC GROUND pin of the HDMI sink connector. The circuit node is readable as a binary signal to indicate the presence of a source device to the HDMI sink connector, wherein the node exhibits a logic low signal when either the node is grounded by the DDC/CEC GROUND pin connection to a source device or when the switching device is switched on. This abstract is not to be considered limiting, since other embodiments may deviate from the features described in this abstract.

18 Claims, 4 Drawing Sheets

HDMI SOURCE DETECTION

CROSS REFERENCE TO RELATED DOCUMENTS

This application is related to U.S. patent application Ser. No. 11/703,304 filed Feb. 6, 2007 which claims priority benefit of U.S. Provisional Application 60/652,313 filed Oct. 16, 2006, both of which are hereby incorporated herein by reference. These applications relate to use of a mechanical switch to detect connection of an HDMI connector.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

As the number of inputs on a TV receiver increases, including inputs compliant with the HDMI (High Definition Multimedia Interface) specification, the time it takes the user to toggle through all the inputs increases. Furthermore, due to the presence of digital video processing, for video scaling significant time can be required to determine the incoming video format and then to process it into a form suitable for the display device. As the user toggles through the multiple inputs, some inputs incur a further delay due to the authentication process of HDCP (High-Bandwidth Digital Content Protection). The net result is that the user may incur significant and annoying delay when cycling through inputs before a video image is displayed on the display device.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
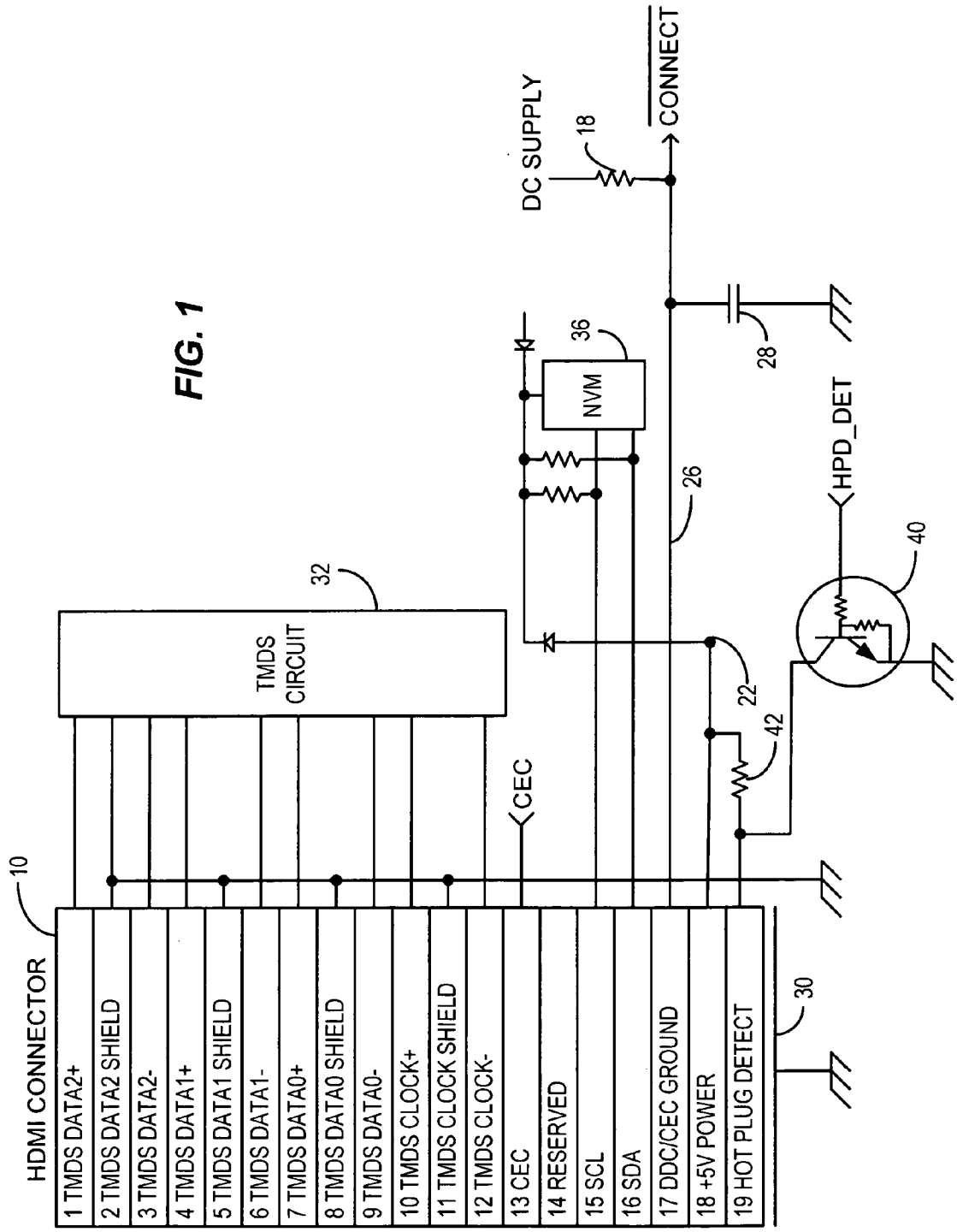
FIG. 1 is a schematic illustrating an embodiment consistent with the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As noted above, as the number of inputs on a TV receiver increases, the time it takes the user to toggle through all the inputs increases. Furthermore, due to the presence of digital video processing, significant time can be required to determine the incoming video format and then to process it into a form suitable for the display device. As the user toggles through the multiple inputs, some inputs incur a further delay due to the authentication process of HDCP. The net result is that the user may incur significant and annoying delay when cycling through inputs before a video image is displayed on the display device. Heretofore, this problem grows as TV receiver devices have increasing numbers of inputs, yet the problem noted herein has gone unrecognized and unaddressed.

In order to improve the user's experience, it is advantageous to adopt a "plug and play" strategy that incorporates automatic input detection. The above-referenced patent applications utilize mechanical switch detection. Embodiments consistent with the present invention utilize ground detection and power detection along with a polling arrangement to provide automatic input detection. The problem is ameliorated in a HDMI (High Definition Multimedia Interface) display input by use of embodiments consistent with the present invention.

In certain embodiments consistent with the present invention, ground detection at the DDC/CEC ground pin of the HDMI connector can be used as an indication of the presence of an HDMI source device connected to the HDMI connector. Additionally, the addition of a transistor and a resistor (or other electronic switching device) can allow for the detection of a source device without having to wait for actual display of the video. The mechanism disclosed herein using a logical "OR" of two deterministic qualities of the HDMI interface to determine whether or not a source device is present or not.

According to the HDMI specification (e.g., version 1.3, a publicly available specification that is hereby incorporated by reference) a source device is supposed to output +5 V on the DDC (Display Data Channel) +5V line (pin 18) when the source device is active, however, there is no requirement for source device to turn off or remove the +5V when the source is inactive. Hence merely detecting the presence of the DDC +5V is insufficient to determine that the source is connected, but inactive. Ideally, it is advantageous to not only discover that an HDMI input has a source connected thereto, but also to determine that the source is actually active.

It is generally the case that the grounds in a HDMI cable are not tied together; but, often in either a source or sink device, the grounds are tied together. Here, the slow speed signal ground, i.e. the ground for the DDC (Display Data Channel) and CEC (Consumer Electronics Control) lines, is not tied directly to ground in the TV receiver. Instead, the slow speed signal ground is connected to the collector of a transistor or the Drain of a FET. Even without the presence of the DDC +5V, the shorting of this ground lead will pull down the signal line, and the TV can detect that a device is connected to that input, albeit not necessarily active.

Once the source device becomes active it must supply +5V on the DDC +5V line in order to be compliant with the HDMI specification, so the transistor will be turned on, and it will actively pull down the ground line to ground.

Turning now to FIG. 1, one embodiment consistent with the present invention is depicted for circuitry in an HDMI sink device such as a video display. HDMI connector 10 is depicted schematically with all of its pin connections as would be present in certain embodiments of an HDMI connector for an HDMI sink. Other embodiments of a connector interface similar to an HDMI connector may also utilize embodiments of the present invention in the event they operate in a similar manner.

In this embodiment, a resistor 18 is used as a pull-up resistor that keeps pin 17 (line or node 26) at a logic high voltage until a device is plugged into the HDMI connector 10.

Interconnection with the TMDS (Transition Minimized Differential Signaling) processing circuitry 32, nonvolatile memory 36 and the Hot Plug Detection driver 40 and associated series resistor 42 are depicted for completeness.

In operation, when a source device is plugged in, line or node 26 is pulled to ground providing a -CONNECT signal that can be detected to determine that an HDMI source device has been plugged in. Since it is generally the case that the grounds in a HDMI cable are not tied together, the presence of a logic low signal at line or node 26 is indicative of a connection. But, when no device is connected to the HDMI connector 10, there is no ground at line or node 26 and line or node 26 is at a logic high state indicating no connected source at the HDMI connector 10. In this event, when a user is cycling through inputs, a high at line or node 26 (-CONNECT) is indicative that no device is connected to the HDMI connector, and the input can be rapidly skipped. But a logic low signal at pin 17 (line or node 26) is indicative that there is a device connected to the connector. By lifting line or node 26 through resistor 18 rather than directly grounding line or node 26 at the sink device, the ground connection serves the dual function of signaling the presence of a connected device. Preferably, a capacitor 28 is provided between line 26 and ground in order to provide a low impedance AC path (i.e, high frequency ground) to ground to help ensure signal integrity.

Figure 2:
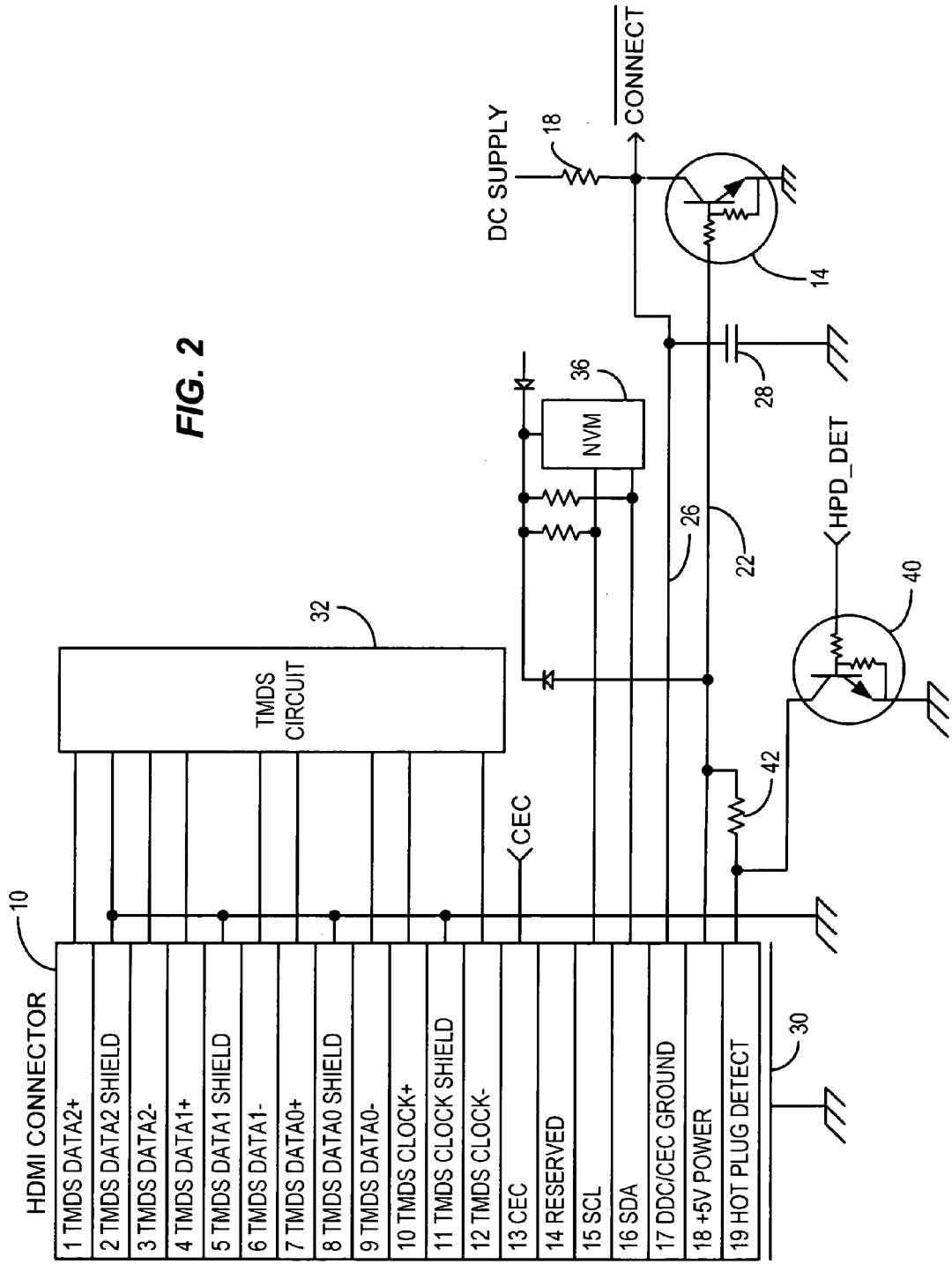
FIG. 2 is a schematic illustrating another embodiment consistent with the present invention.

Turning now to FIG. 2, one embodiment consistent with the present invention is depicted for circuitry in an HDMI sink device such as a video display. HDMI connector 10 is depicted schematically with all of its pin connections as would be present in certain embodiments of an HDMI connector for an HDMI sink. Other embodiments of a connector interface similar to an HDMI connector may also utilize embodiments of the present invention in the event they operate in a similar manner.

In this embodiment, an NPN transistor 14 and a collector resistor 18 are used as a switching mechanism as described. In this example embodiment, the base of transistor 14 is coupled to the +5 volt power (pin 18) 22 of the HDMI connector 10. The DDC/CEC ground (pin 17) 26 of the HDMI connector 10 is coupled to the junction of the collector of transistor 14 and resistor 18, with the other end of resistor 18 connected to a DC power source suitable for the logic circuitry of the HDMI sink (e.g., 3.3 volts). The transistor 14 is shown to have internal base to emitter resistor and series base resistor, but these components could also be provided as external components. The emitter of transistor 14 is coupled to ground. The connector 10 also may have a ground shield 30 as depicted.

Interconnection with the TMDS (Transition Minimized Differential Signaling) processing circuitry 32, nonvolatile memory 36 and the Hot Plug Detection driver 40 and associated series resistor 42 are depicted for completeness.

In operation, per the HDMI specification, when a source device outputs +5 V on the DDC (Display Data Channel) +5V line (pin 18) at 22 when the source device is active, transistor 14 turns on and places the collector at a logic low level and establishes the DDC/CEC ground level. However, as noted above, there is no requirement for source device to turn off or remove the +5V when the source is inactive. Hence merely detecting the presence of the DDC +5V is insufficient to determine that the source is connected, but inactive.

As also noted above, it is generally the case that the grounds in a HDMI cable are not tied together; but, often in either a source or sink device, the grounds are tied together. Here, the slow speed signal ground, i.e. the ground for the DDC (Display Data Channel) and CEC (Consumer Electronics Control) lines, is not tied directly to ground in the TV receiver. Instead, the slow speed signal ground is connected to the collector of transistor 14. When +5V power at 22 is not present, the shorting of line 26 to ground will pull down the signal line at 26, and the TV can detect that a device is connected to the HDMI connector. Once the source device becomes active it must supply +5V on the DDC +5V line in order to be compliant with the HDMI specification, so the transistor will be turned on, and it will actively pull down the ground line to ground. Hence, the sink ground for DDC/CEC is provided at line or node 26 only when a source is providing a path for ground at line or node 26 OR when the +5V power is applied at line 22.

But, when no device is connected to the HDMI connector 10, there is no ground at line or node 26 and line or node 26 is at a logic high state indicating no connected source at the HDMI connector 10. In this event, when a user is cycling through inputs, a high at line or node 26 (-CONNECT) is indicative that no device is connected to the HDMI connector, and the input can be rapidly skipped. But a logic low signal, whether by virtue of transistor 14 being turned on or by virtue of DDC/CEC GROUND at pin 17 (line or node 26) is indicative that there is a device connected to the connector. By lifting line or node 26 through resistor 18 rather than directly grounding line or node 26 at the sink device, the ground connection serves the dual function of signaling the presence of a connected device. Preferably, a capacitor 28 is provided between line 26 and ground in order to provide a low impedance AC path to ground (i.e. a high frequency ground) to help ensure signal integrity.

While the present description is provided in terms of a HDMI sink such as a television display device, it could also be implemented in an HDMI repeater, which for purposes of this document is to be construed as falling within the category of HDMI sink devices. It is also noted that the detection and pull down mechanism could be implemented in other ways, for example, instead of an NPN transistor as shown in the drawing an FET, FET based switch, a logic switch, a PNP transistor or even a relay could be utilized without departing from embodiments consistent with the present invention. It is well understood how to use these devices as switches and thus detailed schematics need not be presented for each example.

Figure 3:
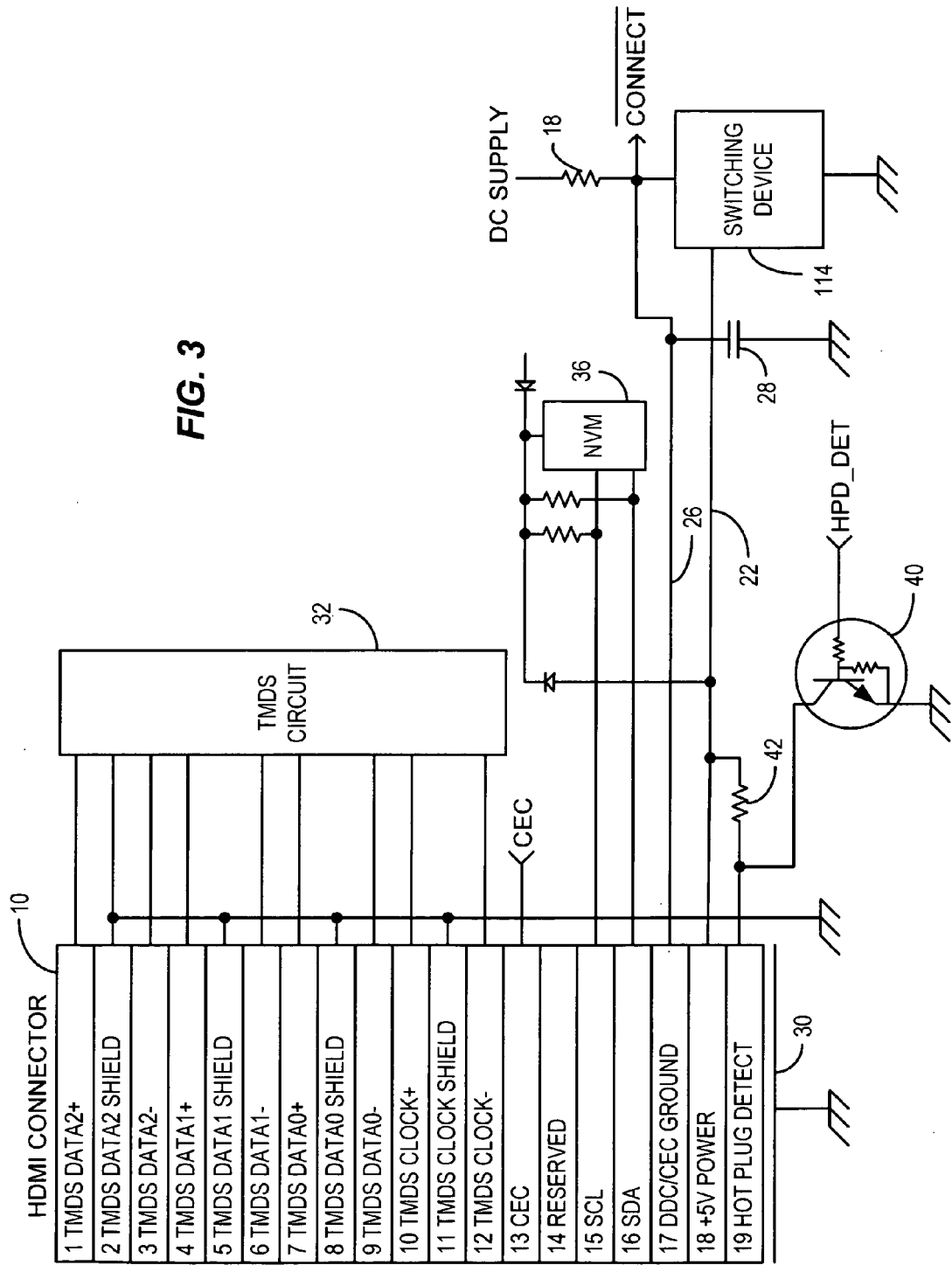
FIG. 3 is a schematic illustrating a generic embodiment of the embodiment of FIG. 2 consistent with the present invention.

FIG. 3 depicts this concept in a more generic representation where transistor 14 is depicted as a switching device 114 which is controlled by an input at 22, turns on upon application of +5V at line 22 and pulls line 26 to ground. When the switch is turned on by virtue of a signal at line 22, node or line 26 is pulled to ground (a logic low state), but when no signal is present at line 22, the switching device is turned off (open circuit between node 26 and ground) to cause a logic high state through pull-up resistor 18. In this generic embodiment, it is presumed that the switching device is stable in that it will remain open circuited when there is no connection to line 22, and hence may utilize a pull-down resistor for noise immunity as is known in the art.

It is noted that a sink device may incorporate multiple HDMI inputs. As such, each HDMI input can be monitored in the manner disclosed. This can be done in parallel or an equivalent simultaneous manner.

Figure 4:
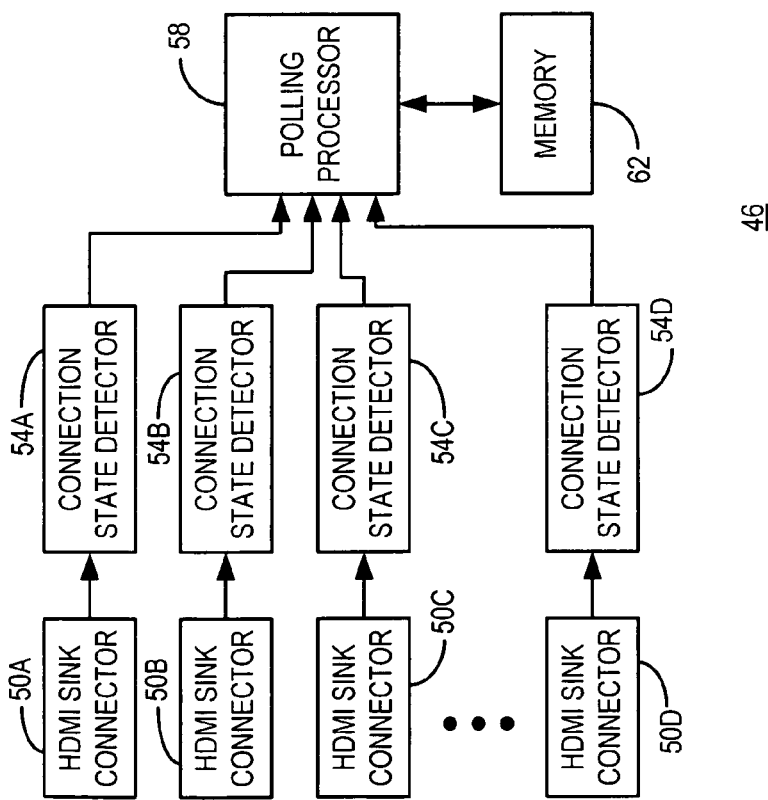
FIG. 4 depicts an embodiment of the invention wherein the sink device has a plurality of circuits for detection of connection state of a corresponding plurality of connections to HDMI connectors in a manner consistent with embodiments of the present invention.

Referring to FIG. 4, it is seen that an HDMI sink device 46 can have multiple HDMI sink connectors 50A, 50B, 50C through 50D. Each of the HDMI sink connectors can have a corresponding plurality of circuits such as those described above shown as connection state detectors 54A, 54B, 54C through 54D respectively. The connection status of each of the connection state detectors 54A, 54B, 54C through 54D can be polled periodically or as required by a polling processor 58 with the polling results stored in a storage device such as memory 62 or logic to simply combine the connected states of the inputs.

Figure 5:
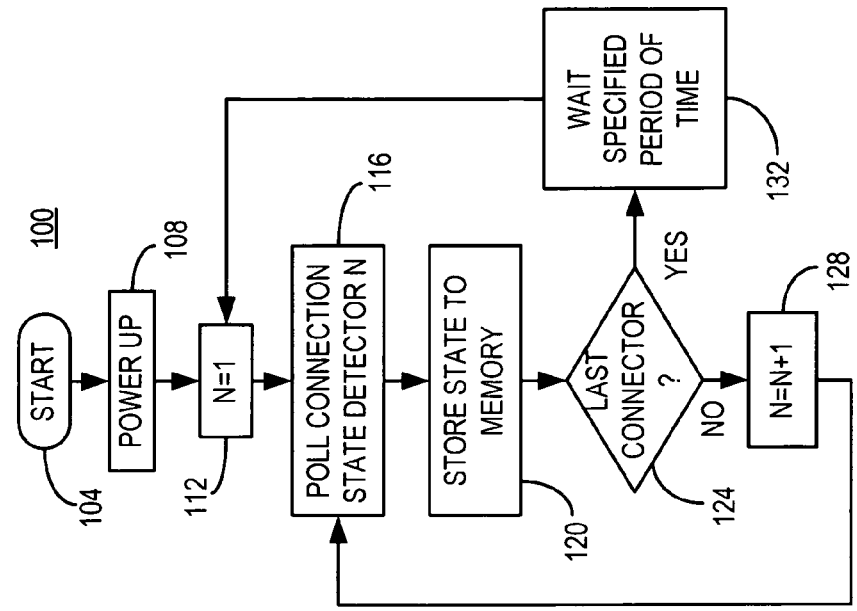
FIG. 5 depicts an exemplary process for polling the connection state of the HDMI connectors of an sink device in a manner consistent with certain embodiments of the present invention.

One exemplary process used in accordance with the arrangement of FIG. 3 is depicted in FIG. 5 as process 100 starting at 104. At 108, the sink device is powered up and a counter N is initialized to 1 at 112 in preparation for an initial polling of the sink connectors. At 116, the Nth (first) connection state detector is polled by the polling processor 58 and the results of the polling are stored in memory 62 at 120. If the last connector has not been polled yet at 124, the counter is incremented by one at 128 and the process returns to 116. If the last connector has been polled at 124, then all of the connectors have been polled and the process introduces a wait period at 132 which can be determined to be a reasonable time period for polling the connectors. Once this wait period has expired, control returns to 112 where the process is repeated at a frequency corresponding to the wait period.

The arrangement disclosed is not an active detection mechanism, but rather a deterministic mechanism. Upon power up, the sink device can check each input for the presence of signal. The sink device can then memorize the connection status of each input. Hence, when the user makes an input selection request, the sink device can skip inputs that do not have a connection, thereby avoiding delays associated with inputs that are inactive and enhancing the speed at which the user can exercise control over his or her system and avoid the delays associated with cycling through inputs that are not connected. In order to assure that the connection state of each input is accurately memorized, each input's stored connection state should be refreshed by polling at a suitably frequent interval. The state of each input can be stored, for example, in non-volatile memory 36, memory 62 or any other suitable storage device.

While the present embodiment uses positive logic conventions, analogous circuitry could be used to generate negative logic or to reverse the indication of a connection so that a low signal means no connection and a high signal means a connection to the sink device without deviating from embodiments consistent with the invention. Buffering or inversion of the signal at node or line 26 may be used in certain embodiments.

Thus, in certain embodiments, a circuit for detection of an HDMI source device to an HDMI sink device through an HDMI sink connector without regard for the activity state of the HDMI source device has an HDMI sink connector having a DDC/CEC GROUND pin. A pull-up resistor having first and second terminals with the first terminal is coupled to a DC power source. The second terminal is further coupled to a DDC/CEC GROUND pin of the HDMI sink connector and forms a circuit node. The circuit node is readable as a binary signal to indicate the presence of a source device to the HDMI sink connector, wherein the node exhibits a logic low signal when the circuit node is grounded by the DDC/CEC GROUND pin connection to a source device. In certain embodiments a storage device that stores an signal indicative of whether or not the HDMI sink connector is connected to an HDMI source device. In certain embodiments, the HDMI connector is polled on a periodic basis to determine whether it is connected to an HDMI source device.

In other certain embodiments, a circuit for detection of an HDMI source device to an HDMI sink device through an HDMI sink connector without regard for the activity state of the HDMI source device has a pull-up resistor having first and second terminals with the first terminal coupled to a DC power source. A switching device is coupled between the pull-up resistor's second terminal and ground at a circuit node. The switching device is switched on to couple the circuit node to ground when power is applied to a control terminal thereof from the HDMI sink connector power pin, and being switched off otherwise. The circuit node is coupled to a DDC/CEC GROUND pin of the HDMI sink connector. The circuit node is readable as a binary signal to indicate the presence of a source device to the HDMI sink connector, wherein the node exhibits a logic low signal when either the node is grounded by the DDC/CEC GROUND pin connection to a source device or when the switching device is switched on.

In certain embodiments, the switching device comprises a junction transistor switch. In certain embodiments, the node coupled to the transistor's collector, the HDMI sink connector's power pin is coupled to the transistor's base and the transistor's emitter is grounded. In certain embodiments, the switching device comprises a field effect transistor switch. In certain embodiments, the switching device comprises a relay. In certain embodiments, the switching device comprises a logic switch. In certain embodiments, the circuit further has a storage device that stores an signal indicative of whether or not the HDMI sink connector is connected to an HDMI source device.

In other embodiments, a circuit for detection of an HDMI source device to an HDMI sink device through an HDMI sink connector without regard for the activity state of the HDMI source device has a pull-up resistor having first and second terminals with the first terminal coupled to a DC power source. A junction transistor switch device coupled between the pull-up resistor's second terminal and ground at a circuit node. The junction transistor switch is switched on to couple the circuit node to ground when power is applied to a base terminal thereof from the HDMI sink connector power pin, and being switched off otherwise. The circuit node is further coupled to a DDC/CEC GROUND pin of the HDMI sink connector. The circuit node is readable as a binary signal to indicate the presence of a source device to the HDMI sink connector, wherein the node exhibits a logic low signal when either the node is grounded by the DDC/CEC GROUND pin connection to a source device or when the junction transistor switch is switched on.

In certain embodiments, the node is coupled to the transistor's collector, the HDMI sink connector's power pin is coupled to the transistor's base and the transistor's emitter is grounded. In certain embodiments, the circuit further has a storage device that stores an signal indicative of whether or not the HDMI sink connector is connected to an HDMI source device.

In another embodiment, a circuit for detection of an HDMI source device to an HDMI sink device through an HDMI sink connector without regard for the activity state of the HDMI source device has a pull-up resistor having first and second terminals with the first terminal coupled to a DC power source. An NPN junction transistor switch device is coupled between the pull-up resistor's second terminal and ground at a circuit node, wherein the node is coupled to the transistor's collector, the HDMI sink connector's power pin is coupled to the transistor's base and the transistor's emitter is grounded. The NPN junction transistor switch is switched on to couple the circuit node to ground when power is applied to a base terminal thereof from the HDMI sink connector power pin, and being switched off otherwise. The circuit node is further coupled to a DDC/CEC GROUND pin of the HDMI sink connector. The circuit node is readable as a binary signal to indicate the presence of a source device to the HDMI sink connector, wherein the node exhibits a logic low signal when either the node is grounded by the DDC/CEC GROUND pin connection to a source device or when the NPN junction transistor switch is switched on. In certain embodiments, the circuit further has a storage device that stores an signal indicative of whether or not the HDMI sink connector is connected to an HDMI source device.

In certain embodiments, a circuit for detection of an HDMI source device to an HDMI sink device through one of a plurality of HDMI sink connectors without regard for the activity state of the HDMI source device has, for each HDMI sink connector, a pull-up resistor having first and second terminals with the first terminal coupled to a DC power source. A plurality of switching devices are each coupled between one of the pull-up resistor's second terminal and ground at a circuit node for each HDMI sink connector. Each switching device is switched on to couple the circuit node to ground when power is applied to a control terminal thereof from the HDMI sink connector power pin, and being switched off otherwise. Each circuit node is further coupled to a DDC/CEC GROUND pin of each respective HDMI sink connector. Each circuit node is readable as a binary signal to indicate the presence of a source device to the respective HDMI sink connector, wherein each node exhibits a logic low signal when either the node is grounded by the DDC/CEC GROUND pin connection to a source device or when the switching device is switched on.

In certain embodiments, each switching device comprises a junction transistor switch. In certain embodiments, each node is coupled to it's respective transistor's collector, each HDMI sink connector's power pin is coupled to it's respective transistor's base and each transistor's emitter is grounded. In certain embodiments, each switching device comprises a field effect transistor switch. In certain embodiments, each switching device comprises a relay. In certain embodiments, each switching device comprises a logic switch. In certain embodiments, a storage device stores an signal indicative of whether or not each HDMI sink connector is connected to an HDMI source device. In certain embodiments, each HDMI connector is polled on a periodic basis to determine whether it is connected to an HDMI source device.

In certain embodiments, an arrangement for detecting a connection state of a plurality of HDMI sink connectors has a plurality of sink connectors residing on an HDMI sink device. A corresponding plurality of connection state detectors detect a state of connection of each of the sink connectors by detecting a DDC/CEC ground state that is produced either by a ground connection through the respective sink connector from an HDMI source or by detecting a switched ground state at the DDC/CEC ground connection created within the sink device by a switch controlled by virtue of power applied to the sink connectors from connection to the HDMI source. A storage device stores the state of each respective connector. A polling circuit polls each of the connection detectors and stores the state of connection of each of the connection detectors to the memory. The polling can be carried out on a periodic basis. The polling can be carried out after powering up the HDMI sink device.

In certain embodiments, a method for detecting a connection state of a plurality of HDMI sink connectors involves providing a plurality of connection state detectors that detect a state of connection of each of a plurality of sink connectors by detecting a DDC/CEC ground state that is produced either by a ground connection through the respective sink connector from an HDMI source or by detecting a switched ground state at the DDC/CEC ground connection created within the sink device by a switch controlled by virtue of power applied to the sink connectors from connection to the HDMI source; polling each of the connection detectors to determine its state of connection; and storing the state of connection of each of the connection detectors to the memory. The polling can be carried out on a periodic basis. The polling can be carried out after powering up the HDMI sink device.

While certain illustrative embodiments have been described, it is evident that many alternatives, modifications, permutations and variations will become apparent to those skilled in the art in light of the foregoing description.

What is claimed is:

1. A circuit for detection of an HDMI source device to an HDMI sink device through an HDMI sink connector without regard for the activity state of the HDMI source device, comprising in combination:

a pull-up resistor having first and second terminals with the first terminal coupled to a DC power source;

a switching device coupled between the pull-up resistor's second terminal and ground at a circuit node;

the switching device being switched on to couple the circuit node to ground when power is applied to a control terminal thereof from the HDMI sink connector power pin, and being switched off otherwise;

the circuit node being further coupled to a DDC and a CEC ground connection of the HDMI sink connector; and the circuit node being readable as a binary signal to indicate the presence of a source device to the HDMI sink connector, wherein the node exhibits a logic low signal when either the node is grounded by the DDC and CEC ground connection to a source device or when the switching device is switched on.

2. The circuit according to claim 1, wherein the switching device comprises a junction transistor switch.

3. The circuit according to claim 2, wherein the node is coupled to the transistor's collector, the HDMI sink connector's power pin is coupled to the transistor's base and the transistor's emitter is grounded.

4. The circuit according to claim 1, wherein the switching device comprises a field effect transistor switch.

5. The circuit according to claim 1, wherein the switching device comprises a relay.

6. The circuit according to claim 1, wherein the switching device comprises a logic switch.

7. The circuit according to claim 1, further comprising a storage device that stores an signal indicative of whether or not the HDMI sink connector is connected to an HDMI source device.

8. A circuit for detection of an HDMI source device to an HDMI sink device through an HDMI sink connector without regard for the activity state of the HDMI source device, comprising in combination:
a pull-up resistor having first and second terminals with the first terminal coupled to a DC power source;
a junction transistor switch device coupled between the pull-up resistor's second terminal and ground at a circuit node;
the junction transistor switch being switched on to couple the circuit node to ground when power is applied to a base terminal thereof from the HDMI sink connector power pin, and being switched off otherwise;
the circuit node being further coupled to a DDC and CEC ground connection of the HDMI sink connector; and
the circuit node being readable as a binary signal to indicate the presence of a source device to the HDMI sink connector, wherein the node exhibits a logic low signal when either the node is grounded by the DDC and CEC ground connection to a source device or when the junction transistor switch is switched on.

9. The circuit according to claim 8, wherein the node is coupled to the transistor's collector, the HDMI sink connector's power pin is coupled to the transistor's base and the transistor's emitter is grounded.

10. The circuit according to claim 8, further comprising a storage device that stores an signal indicative of whether or not the HDMI sink connector is connected to an HDMI source device.

11. A circuit for detection of an HDMI source device to an HDMI sink device through an HDMI sink connector without regard for the activity state of the HDMI source device, comprising in combination:
a pull-up resistor having first and second terminals with the first terminal coupled to a DC power source;
an NPN junction transistor switch device coupled between the pull-up resistor's second terminal and ground at a circuit node, wherein the node is coupled to the transistor's collector, the HDMI sink connector's power pin is coupled to the transistor's base and the transistor's emitter is grounded;
the NPN junction transistor switch being switched on to couple the circuit node to ground when power is applied to a base terminal thereof from the HDMI sink connector power pin, and being switched off otherwise;
the circuit node being further coupled to a DDC and CEC ground connection of the HDMI sink connector; and
the circuit node being readable as a binary signal to indicate the presence of a source device to the HDMI sink connector, wherein the node exhibits a logic low signal when either the node is grounded by the DDC and CEC ground connection to a source device or when the NPN junction transistor switch is switched on.

12. The circuit according to claim 11, further comprising a storage device that stores an signal indicative of whether or not the HDMI sink connector is connected to an HDMI source device.

13. A circuit for detection of an HDMI source device to an HDMI sink device through one of a plurality of HDMI sink connectors without regard for the activity state of the HDMI source device, comprising in combination:
for each HDMI sink connector, a pull-up resistor having first and second terminals with the first terminal coupled to a DC power source;
a plurality of switching devices, each coupled between one of the pull-up resistor's second terminal and ground at a circuit node for each HDMI sink connector;
each switching device being switched on to couple the circuit node to ground when power is applied to a control terminal thereof from the HDMI sink connector power pin, and being switched off otherwise;
each circuit node being further coupled to a DDC and CEC ground connection of each respective HDMI sink connector; and
each circuit node being readable as a binary signal to indicate the presence of a source device to the respective HDMI sink connector, wherein each node exhibits a logic low signal when either the node is grounded by the DDC and CEC ground connection to a source device or when the switching device is switched on.

14. The circuit according to claim 13, wherein each switching device comprises a junction transistor switch.

15. The circuit according to claim 14, wherein each node is coupled to it's respective transistor's collector, each HDMI sink connector's power pin is coupled to it's respective transistor's base and each transistor's emitter is grounded.

16. The circuit according to claim 14, wherein each switching device comprises at least one of a field effect transistor switch, a relay and a logic switch.

17. The circuit according to claim 14, further comprising a storage device that stores an signal indicative of whether or not each HDMI sink connector is connected to an HDMI source device.

18. The circuit according to claim 14, wherein each HDMI connector is polled on a periodic basis to determine whether it is connected to an HDMI source device.

* * * * *